Feb. 15, 1938.  R. LAKEY  2,108,680
COOLING TOWER
Filed Oct. 1, 1936
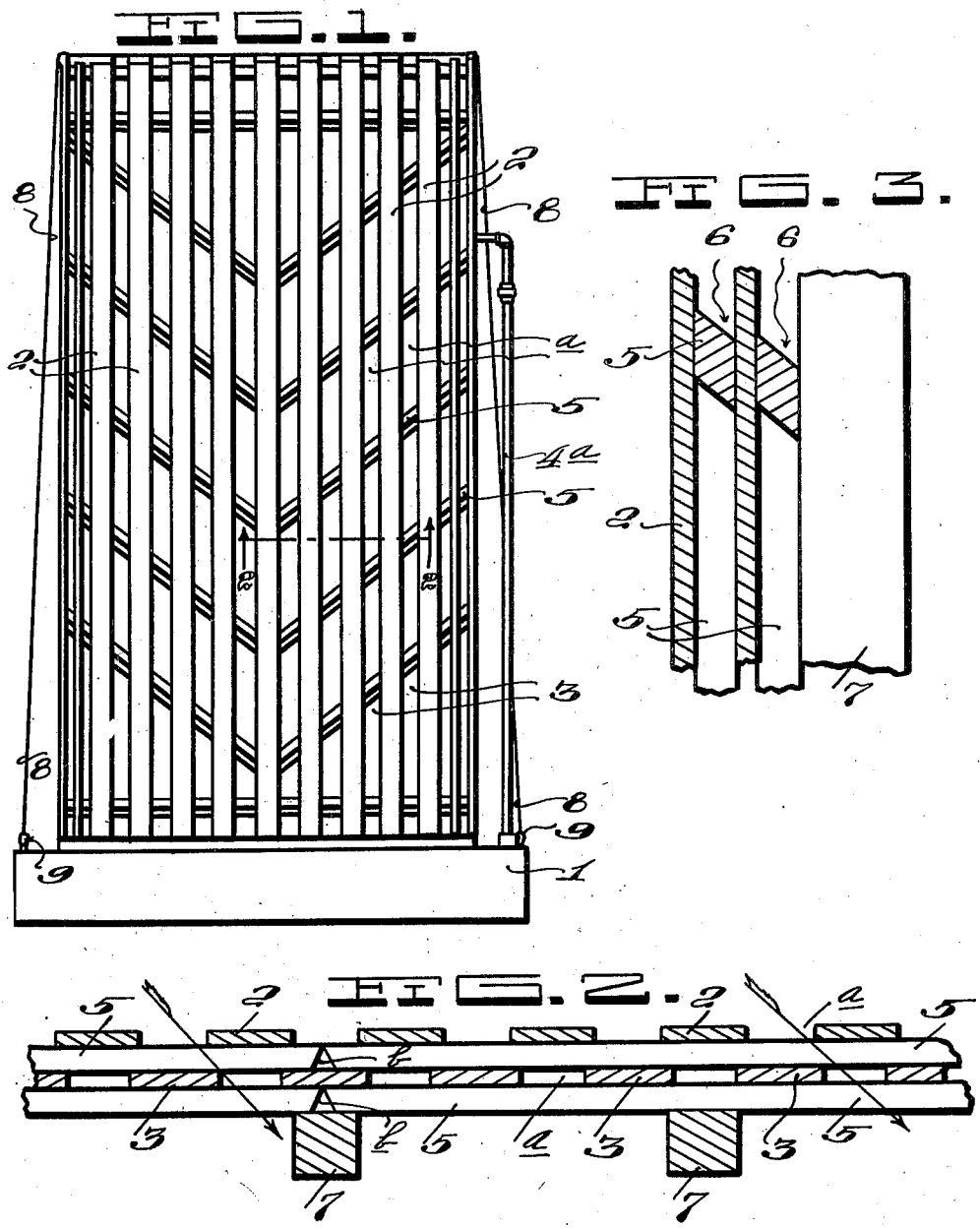
Ray Lakey
INVENTOR
BY
ATTORNEY Patented Feb. 15, 1938

2,108,680

UNITED STATES PATENT OFFICE 2,108,680

COOLING TOWER

Ray Lakey, Denton, Tex.

Application October 1, 1936, Serial No. 103,488

4 Claims. (Cl. 261—110)

This invention relates to cooling or aeration towers and it has particular reference to towers for aerating water preparatory to the manufacture of ice.

The principal object of the invention is to provide a tower of the character set forth which is constructed to reduce to a minimum many of the objectionable features present in the conventional louver type of tower, such for example, as the spilling of water, especially in high winds.

The present invention has for one of its objects the added feature of a pleasing appearance, its elements of construction being symmetrical and decorative.

With the foregoing objects as paramount, the invention has particular reference to its salient features of construction and arrangement of parts which will become manifest as the description proceeds, taken in connection with the accompanying drawing, wherein:—

Figure 1 is an elevation of a cooling tower constructed according to the present invention.

Figure 2 is a plan section taken on lines 2—2 on Figure 1, and

Figure 3 is a detail view, partly in section, showing the relative positions of the vertical baffle boards, oblique drains and supporting studs.

Continuing with a more detailed description of the drawing, it may be first stated that the conventional type of cooling tower for cooling water which has been heated by radiation, or otherwise, employs the use of a system of louvers arranged in a V-shaped formation in cross-section. Such an arrangement, while in universal use, does not accomplish its purpose to the greatest degree of efficiency, because it loses water by up-currents blowing out small amounts. If the louvers are placed close enough together to overcome this trouble, their cooling efficiency is impaired.

The present invention anticipates the provision of a wall around the screens and baffle plates which consists of vertically disposed strips of timber which may be termed vertical baffles, whose edges are relatively overlapping as illustrated in the drawing, for purposes hereinafter set forth.

Accordingly, I designates a basin, constructed preferably of concrete. Disposed within this basin is the tower, whose walls are comprised of vertically disposed, relatively parallel baffle boards 2, the edges of which slightly overreach the edges of the boards 3 of the inner and similarly constructed wall, as shown. Thus staggered, the boards 2 and 3 afford passages *a* through which air may pass in a manner suggested by the arrows in Figure 2. However, it is obvious that while the frame-work is open to free passage of air for aeration and cooling of the precipitated water, elevated to the top of the tower in any conventional manner, as by pipe 4a under suitable pump pressure, overlapping of the baffles will prevent the objectionable blowing of the water over the immediate locality of the tower.

The boards or baffles 2 and 3 are separated by obliquely disposed timbers 5. These timbers are not only obliquely or angularly disposed and relatively spaced on the sides of the tower but are also obliquely cut along their longitudinal surfaces as shown in Figure 3. This manner of construction affords drainage surfaces 6 adjacent the inner baffle wall in order that water in its downward travel will tend to flow inwardly thereby aiding in the prevention of dispersion.

The lower or meeting ends of the converging timbers 5 are cut in the manner shown at *b* in Figure 2 to provide a passage for water flowing down the channels 6.

The entire wall structure described is nailed or otherwise affixed to the vertical studs 7, spaced within the walls. A guy wire or cable 8, secured at its ends to a hook or eye 9, embedded in the concrete base is found to be a suitable means for steadying the structure.

It is apparent from the foregoing that the invention is not only efficient in retaining water, precipitated for cooling and other purposes, within the confines of the tower without reducing the effectiveness of this operation, but is also pleasing in appearance and design.

Manifestly, the construction as shown and described is capable of some modification and such modification as may be construed within the scope and meaning of the appended claims is also considered to be within the spirit and intent of the invention.

What is claimed is:—

1. A water cooling tower including a wall structure including vertically disposed and relatively spaced baffles constituting outer and inner walls, members disposed in V-formation for separating said walls, to which said baffles are secured, and whose longitudinal upper and lower surfaces are obliquely cut to direct the water inwardly of said tower the contiguous ends of said members being disposed to provide passages to drain the surfaces of said members.

2. A water cooling tower including a wall structure including a series of vertically disposed and relatively spaced baffles, a second series of similarly disposed baffles whose edges overlap those of said first series, means for intercepting and directing precipitating water inwardly of said tower comprising a plurality of pairs of obliquely disposed members interposed between the first and second series of vertical baffles in V-formation and whose upper surfaces are inclined inwardly.

3. A water cooling tower including spaced walls including relatively spaced, overlapping baffles in vertical position and spacing means comprising angularly disposed members in horizontally spaced V-shape formation between said baffles to define means to direct water inwardly of said tower.

4. A water cooling tower including spaced walls comprising relatively spaced baffles whose sides are overlapping and which baffles are disposed in vertical position and spacing means comprising angularly disposed members in V-shape and horizontally spaced relationship to define drainage surfaces intermediate said walls for directing precipitating water inwardly of said tower, said surfaces having outlets at their lower ends.

RAY LAKEY.